CURRENT COLLECTING TRIPLE WAFER BRUSH ASSEMBLY
Filed Dec. 26, 1967
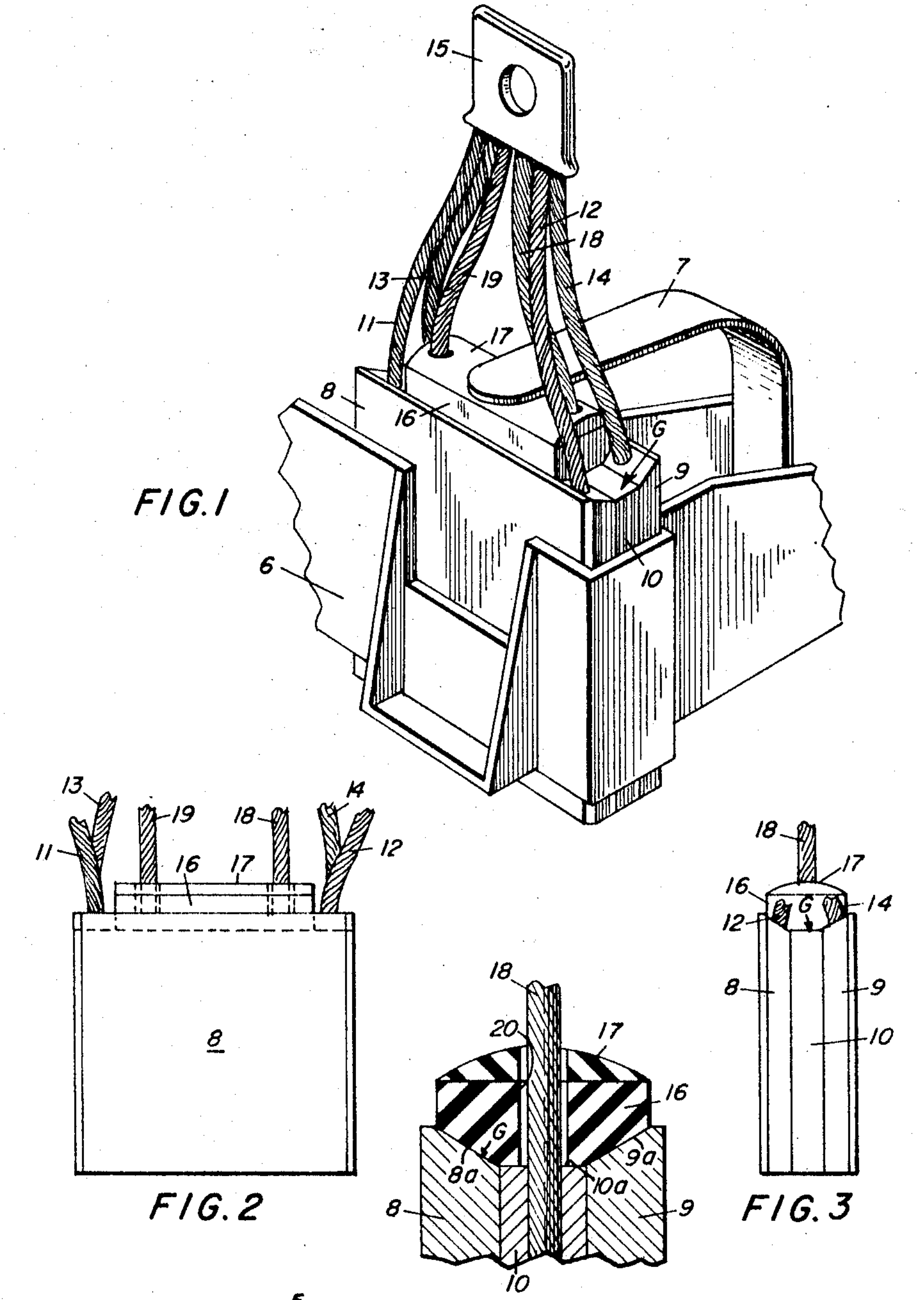
FIG. 1, FIG. 2, FIG. 3
FIG. 5
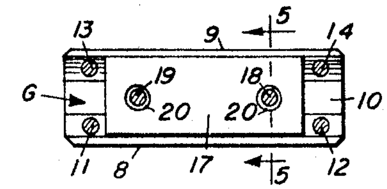
FIG. 4
INVENTORS
SHELDON A. ROKAW
DAVID J. KING
BY [signature]
ATTORNEY United States Patent Office 3,445,704

Patented May 20, 1969

3,445,704

CURRENT COLLECTING TRIPLE WAFER BRUSH ASSEMBLY

Sheldon A. Rokaw, Queens Village, and David J. King, Rockville Centre, N.Y., assignors to Morganite Incorporated, New York, N.Y., a corporation of New York Filed Dec. 26, 1967, Ser. No. 693,492

Int. Cl. H02k *13/10;* H01r *39/40*

U.S. Cl. 310—246 7 Claims

ABSTRACT OF THE DISCLOSURE

An electric brush assembly having three relatively thin carbon brush wafers, slidably insertable side-by-side in a brush holder. The top edges of the two outer wafers diverge upwardly and outwardly, while the top edge of the center wafer is flat and lies contiguous with the lower boundaries of the diverging surfaces of respective outer wafers, to jointly form a truncated V-groove. A resilient pressure pad, having a complementary engaging surface, slidably engages the truncated V-groove of the wafer tops, and is of a length less than that of the groove so that its extremities are inwardly offset from the ends of the grooves. Pairs of flexibles are anchored in the outer wafers adjacent opposite ends of the groove and spaced from the extremities of the pad. A pair of flexibles are anchored in the center wafer at points inwardly staggered with respect to the anchor points of the outer flexibles, and openings in the pad slidably receive these center flexibles, thus locating the pad's position.

*Background of invention*

Electric multiple wafer brushes of the type comprising two or more brush wafers to bear on and sweep the surface of the commutator are known. With these brush assemblies, the separate wafers are capable of a certain degree of independent movement, all wafers being pressed against the commutator surface by a pressure finger and being connected electrically to a common terminal.

A reason for making these brushes with two or more separate wafers has been to achieve improved current collection between brush and commutator. Furthermore, such brushes offer greater resistance to the passage of current transversely through the brush from one commutator segment to another during their short circuit at the brushes thus reducing sparking.

It has been found, especially with large diesel electric traction motors, that brushes made up of three wafers arranged face-to-face in the holder, are particularly advantageous, but this type of brush presented a problem in acquiring proper pressure distribution of the spring finger against the brush wafers, especially upon changes in direction of rotation of the commutator which caused repeated reseating of the brushes and resulted in damage thereto.

An object of the present invention is to provide a three wafer brush which insures positive pressure on all three wafers, and gives greater brush stability on reversing duty and improved current collection, as well as reduction of local circulating currents.

Another object of the invention is to provide a three wafer brush wherein rubbing and fraying of the flexibles is avoided, and which provides improved vibration damping ability and greater freedom of movement of the individual wafers.

This is accomplished by providing the two outer wafers with upwardly and outwardly diverging top edges and employing a center wafer having a flat top which lies contiguous with the lower boundaries of the diverging surfaces of the outer wafers to jointly form a substantially truncated V-shaped groove for receiving the pressure pad.

Still another object of the invention is to provide a multiple wafer brush which affords improved pressure distribution giving improved brush to commutator contact, particularly where movement of brushes would normally occur due to external vibration and/or out-of-round condition of commutator.

Still another object is to provide positive location of the resilient pad on the tops of the wafers without resorting to bonding between pad and brush.

With the above and other objects in view which will appear as the description proceeds, the invention consists in the novel features herein set forth, illustrated in the accompanying drawings, and more particularly pointed out in the appended claims.

*The drawings*

Referring to the drawings in which numerals of like character designate similar parts throughout the several views:

FIG. 1 is a perspective view of the brush assembly of the present invention, mounted in a conventional holder;

FIG. 2 is a view of the brush assembly in side elevation;

FIG. 3 is an end view;

FIG. 4 is a top plan view; and

FIG. 5 is an enlarged, fragmentary, sectional view taken on line 5—5 of FIG. 4.

*Specification*

In the drawings, a more or less conventional brush holder is shown at 6, having the usual pressure finger 7, one end of which overlies the top of the brush to spring bias the latter into engagement with the commutator (not shown). The brush assembly of the invention comprises two outer wafers 8 and 9, and a center wafer 10 interposed therebetween in face-to-face engagement. The brushes are formed of carbon of other suitable known material, and the individual wafers are relatively thin as shown in FIG. 3.

The upper edges of the two outer wafers 8 and 9 are upwardly and outwardly inclined as at 8*a* and 9*a*, respectively, while the upper edge of the center wafer 10 is flat as at 10*a*, so that when assembled, the upper edges of all three wafers jointly form a truncated V-groove, generally indicated at G, extending longitudinally across the top of the assembly. A pair of shunt wires or flexibles 11–12 are anchored in top of the outer wafer 8 by embedding one end of each in the wafer. Similarly, a pair of flexibles 13–14 have one end of each embedded in the top of the outer wafer 9, and both of these pairs of flexibles project upwardly from the inclined upper edges of respective outer wafers for connection to a common terminal 15.

A relatively thick pressure pad 16, composed of soft rubber or similar resilient material, and preferably having a hard top 17 of insulating material, is designed to fit within the truncated V-groove formed by the assembled wafers, and its bottom surface is of a complementary shape to insure sliding engagement with the inclined surfaces 8*a* and 9*a*, as well as the flat top surface 10*a* of the respective wafers, as best seen in FIG. 5. The pad 16 is shorter than the length of the truncated V-groove G, its longitudinal extremities being inwardly offset with respect to the anchored ends of the flexibles 11–14 on the outer wafers so that said flexibles are free of the pad 16.

A third pair of flexibles 18 and 19 are anchored at opposite ends of the flat top 10*a* of the center wafer 10 and pass freely through openings 20 extending vertically through the pad 16, for connection to the terminal 15 at their opposite ends. As best seen in FIGS. 1 and 4, when the three wafers are assembled, the center flexibles 18, 19 are in staggered relation to the outer wafer flexibles 11, 13 and 12, 14, and the spring pressure finger 7 overlies the hard top 17 at a point intermediate its ends to cause a uniform downward pressure on the pad 16 and, in turn, on the three wafers.

It will be apparent that the complementary engaging surfaces of the underside of the pad 16 with those of the truncated V-groove, under the downward pressure exerted by the spring finger 7, provides a positive pressure on the tops of all three wafers. The flat central surface on the underside of the pad 16 causes a direct downward pressure on the corresponding flat top surface of the center wafer 10, while the inclined surfaces of the pad provide side and downward thrust on the outer wafers 8 and 9. The staggered arrangement of flexibles reduces rubbing and fraying of the flexibles. The coacting truncated V-contours of the bottom of the pad 16 and the wafer groove provide the desired pressure distribution of the rubber against the carbon, which would not be possible with strictly V-shaped contours of pad and groove, since with a strictly V-shaped contour, it is likely that the apex of the rubber pad would wedge into the center section and fail to provide adequate side pressure for the outer two wafers. This side pressure is highly desirable to provide an outward force against the brush holder to thereby prevent repeated reseating of the brushes upon changes in direction of rotation of the commutator.

Furthermore, the manufacture of a strictly V-shaped groove in the center wafer would be far more difficult than the truncated V-arrangement of the present invention because, in an effort to prevent the problems outlined above, it would be necessary to insure a continuity of surface with a strictly V-groove. This problem is eliminated by providing the flat top center wafer.

In addition, improved vibration damping and greater freedom of movement of the individual wafers are provided due to increased rubber present in the relatively thick pad 16, while the hard insulating top prevents damage by the pressure finger.

From the foregoing, it is believed that the invention may be readily understood by those skilled in the art without further description, it being borne in mind that numerous changes may be made in the details disclosed without departing from the spirit of the invention as set forth in the following claims.

We claim:

1. An electric current collecting, multiple wafer brush assembly, comprising at least three relatively thin brush wafers arranged side-by-side in surface contact, the top edges of the outer wafers having upwardly and outwardly diverging surfaces, the top edge of the center wafer being flat and contiguous with the lower boundaries of the diverging surfaces of respective outer wafers, to jointly form a substantially truncated V-shaped groove extending across the top of the assembly, a resilient pressure pad having a complementary, truncated V-shaped bottom, disposed in said groove, upwardly directed flexibles anchored at opposite ends of respective outer wafers, upwardly directed flexibles anchored in opposite ends of said center wafer, and openings in said pad for slidably accommodating said last-named flexibles.

2. A brush assembly as claimed in claim 1, wherein the flexibles of said center wafer are arranged in staggered relation to the flexibles of said outer wafers.

3. A brush assembly as claimed in claim 2, wherein the longitudinal extremities of said pad are inwardly offset with respect to the longitudinal extremities of said groove.

4. A brush assembly as claimed in claim 1, wherein the flexibles of said center wafer are longitudinally offset inwardly with respect to the flexibles of said outer wafers.

5. A brush assembly as claimed in claim 1, wherein said pressure pad comprises a soft rubber base and a top of hard insulating material.

6. A brush assembly as claimed in claim 1, wherein the flexibles of said center wafer physically locate the truncated V-shaped resilient pad in the complementary engaging surfaces of the tops of the brush wafers without the use of a bonding agent.

7. A brush as claimed in claim 1, wherein the flexibles of said outer wafers and said center wafer are arranged in staggered relation.

References Cited

UNITED STATES PATENTS

| | | | |
|---|---|---|---|
| 2,477,766 | 8/1949 | Reinker | 310—246 |
| 2,520,379 | 8/1950 | Ward | 310—246 |
| 2,579,565 | 12/1951 | Giambonini | 310—246 |
| 2,796,544 | 6/1957 | Silverman | 310—246 |
| 3,311,768 | 3/1967 | Mowry | 310—246 |

MILTON O. HIRSHFIELD, *Primary Examiner.*

L. L. SMITH, *Assistant Examiner.*

U.S. Cl. X.R.

310—249